United States Patent
Canard et al.

(10) Patent No.: US 8,650,403 B2
(45) Date of Patent: Feb. 11, 2014

(54) CRYTOGRAPHIC METHOD FOR ANONYMOUS AUTHENTICATION AND SEPARATE IDENTIFICATION OF A USER

(75) Inventors: Sébastien Canard, Caen (FR); Amandine Jambert, Nancy (FR); Eric Malville, Montgermont (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 13/375,736

(22) PCT Filed: Jun. 11, 2010

(86) PCT No.: PCT/FR2010/051167
§ 371 (c)(1),
(2), (4) Date: Dec. 1, 2011

(87) PCT Pub. No.: WO2010/142923
PCT Pub. Date: Dec. 16, 2010

(65) Prior Publication Data
US 2012/0072732 A1    Mar. 22, 2012

(30) Foreign Application Priority Data
Jun. 12, 2009    (FR) ...................................... 09 53953

(51) Int. Cl.
*H04L 9/32*    (2006.01)

(52) U.S. Cl.
USPC ................. 713/176; 713/168; 713/171; 726/2

(58) Field of Classification Search
USPC .............................. 713/176, 168, 171; 726/2
See application file for complete search history.

(56) References Cited

U.S. PATENT DOCUMENTS 7,900,050 B2 *    3/2011    Izu et al. ....................... 713/176
(Continued)

FOREIGN PATENT DOCUMENTS

| EP | 1 808 795 A2 | 7/2007 |
| GB | 2446171 A * | 8/2008 |
| WO | WO 2008/149029 A2 | 12/2008 |

OTHER PUBLICATIONS

Sébastien Canard et al., "Trapdoor Sanitizable Signatures and Their Application to Content Protection", Jun. 5, 2007, Applied Cryptography and Network Security; [Lecture Notes in Computer Science], Springer Berlin Heidelberg, Berlin, Heidelberg, pp. 258-276, XP019076275.

Christina Brzuska et al., "Security of Sanitizable Signatures Revisited", Mar. 18, 2009, Public Key Cryptography a PKC 2009, Springer Berlin Heidelberg, Berlin, Heidelberg, pp. 317-336, XP019115182.

(Continued)

*Primary Examiner* — Samson Lemma
(74) *Attorney, Agent, or Firm* — Knobbe Martens Olson & Bear LLP

(57) ABSTRACT

The invention relates to cryptographic method for the anonymous authentication and the identification of a user entity ($U_i$) respectively by a checking entity (D) and an identifying entity (O). According to this method, the checking entity (D) receives (130) from the user entity (U1) at least one first signature ($\sigma$) and a first message (m), and checks (140) the first signature ($\sigma$) using the first message (m) in order to authenticate the user (U), and the identifying entity (O) receives (150) from the checking entity (D) a second signature ($\sigma'$) connected to the first signature ($\sigma$) and identifies (160) the user using the second signature and a secret key particular thereto. The invention also relates to a cryptographic system for implementing said method.

15 Claims, 7 Drawing Sheets

(56) References Cited

U.S. PATENT DOCUMENTS

| | | | |
|---|---|---|---|
| 8,078,876 B2* | 12/2011 | Brickell et al. | 713/176 |
| 8,145,897 B2* | 3/2012 | Brickell et al. | 713/155 |
| 2004/0098625 A1* | 5/2004 | Lagadec et al. | 713/201 |
| 2010/0082973 A1* | 4/2010 | Brickell et al. | 713/155 |
| 2010/0174911 A1* | 7/2010 | Isshiki | 713/182 |
| 2010/0317420 A1* | 12/2010 | Hoffberg | 463/1 |
| 2011/0154045 A1* | 6/2011 | Lee et al. | 713/176 |
| 2012/0284518 A1* | 11/2012 | Walker et al. | 713/171 |

OTHER PUBLICATIONS

Xiaofeng Chen et al., "Chameleon Hashing Without Key Exposure", Lecture Notes in Computer Science, Springer, DE LNKD-DOI: 10.1007/B100936, vol. 3225, Sep. 21, 2004, pp. 87-98, XP007912633.

Benoît Chevallier-Mames, "An Efficient CDH-Based Signatures Scheme with a Tight Security Reduction", Jan. 1, 2005, Advances in Cryptology—Crypto 2005 Lecture Notes in Computer Science; LNCS, Springer, Berlin, DE, pp. 511-526, XP019016572.

* cited by examiner

CRYTOGRAPHIC METHOD FOR ANONYMOUS AUTHENTICATION AND SEPARATE IDENTIFICATION OF A USER

This application is a 35 U.S.C. §371 National Stage entry of International Application No. PCT/FR2010/051167, filed on Jun. 11, 2010, and claims the benefit of French Application No. 0953953, filed on Jun. 12, 2009, each of which are hereby incorporated by reference in their entireties as if fully set forth herein.

The invention relates to a cryptographic method for the separate anonymous authentication and identification of a user, particularly in the field of anonymous invoicing of a user.

The field of cryptography has recently seen significant growth. Diverse cryptographic tasks can be performed such as the signing of a message by a sender, the authentication of a message sender, or the identification of a message sender by a verifying unit. These tasks contribute to guaranteeing certain levels of security to the services that use them.

However, services can exist which also request or guarantee a certain level of anonymity. For example, a user may want authentication with a first entity in order to request an action, without the entity knowing his identity, while still identifying himself with a second entity without the latter entity having knowledge of the action required from the first entity. This type of requirement, anonymity, is linked to privacy protection issues.

An example of this type of situation is encountered when a user requests a paying service from a supplier while wanting to remain anonymous. The supplier must be able to send an invoice to the user, without knowing the user's true identity, in order to be paid for the services rendered. It is also desirable that no one be capable of making the link between the user and the requested service.

Most existing invoicing solutions do not consider the case where the user is anonymous, and therefore do not resolve the above issues in a satisfactory manner. The cryptographic tasks listed above do not provide an answer to this problem, either.

Certain subscription solutions exist, using prepayment, in which the user pays a subscription for a certain number of accesses during a period of time while allowing the user to maintain his anonymity to a certain extent.

One of these solutions (called "Anonymask") consists of creating an account with a third party, which allows the customer to pay the provider anonymously. Another solution consists of obtaining anonymous and blind certification of a set of tokens corresponding to a specific number of authorized accesses, which will then be sent to the provider one by one.

A last solution proposes that a user making a purchase on the internet clicks on a "Buy" button which redirects him to a third party where a product reference has been entered by the service provider. The customer is then authenticated and his account is debited, via future invoicing or with a credit card.

All these solutions, although they are oriented towards improving user anonymity, do not offer an absolute level of anonymity. For example, in the last solution, the transactions are centralized at the third party server, which knows the identity of the customer and of the service provider, and possibly a reference for the purchased product. This third party server therefore has all the information needed to trace the information concerning a specific user.

There is therefore no current solution that allows a user to obtain paying services from a provider while maintaining his anonymity and while allowing the provider to invoice for the provided service without using a subscription-based principle.

The present invention improves the situation.

In particular, an object of the invention is the use of a cryptographic method which allows, on the one hand, a service provider to authenticate a user without the provider having access to the user's identity, and which allows, on the other hand, an invoicing entity to identify the user without having any knowledge of the type of service provided.

For this purpose, it offers a cryptographic method for anonymous authentication and identification of a user entity by a checking entity and an identifying entity respectively, wherein the checking entity receives from the user entity at least one first signature and a first message and verifies the first signature by means of the first message in order to authenticate the user entity, and wherein the identifying entity receives from the checking entity a second signature linked to the first signature and identifies the user entity by means of the second signature and of a secret key specific to the identifying entity.

In a preferred embodiment, the checking entity generates the second signature from the first signature as a function of at least a first part of the first message received. This allows centralizing the calculation means in the checking entity rather than in the user entity.

Advantageously, the checking entity generates a second message from the first message by replacing the first part of the first message with substitution data, and sends the second message to the identifying unit. The second message is thus constructed from the first message in a simple manner.

In a preferred embodiment wherein the checking entity is able to provide a service to the user entity if the checking entity authenticates the user entity, and wherein the identifying entity is able to invoice the user entity for this service, the first part of the first message indicates a service requested by the user entity and the second message comprises at least one part indicating the invoicing level related to the required service.

In a preferred embodiment, the substitution data indicates the invoicing level related to the required service, which allows indicating to the identifying entity O the invoicing level related to the service although still hiding this service.

In another preferred embodiment, the first message comprises a second part indicating the invoicing level related to the required service, the substitution data then being sent by the user entity to the checking entity, which allows the user entity $U_i$ to indicate the invoicing level for the service it is requesting.

Preferably, the method comprises, in the identifying entity, the verification of the second signature by means of the second message.

In another preferred embodiment, wherein the first message comprises a first part, the first signature is generated in the user entity as a function of the first message, and the second signature is generated as a function of a second message corresponding to the first message in which the first part has been replaced by substitution data. Here, the message intended for the identifying entity is directly generated by the user entity.

Advantageously, the second signature comprises at least one supplemental portion comprised in the first signature, the method then comprising a verification step in the checking entity, to verify that the first and second signatures comprise this supplemental part. This allows verifying that the two signatures do indeed originate from the same user entity.

In a preferred embodiment, wherein the checking entity is able to provide a service to the user entity if the checking entity authenticates the user entity, and wherein the identifying entity is able to invoice the user entity for this service, the first part indicates a service requested by the user entity and the substitution data indicates an invoicing level related to the requested service.

Preferably, the method comprises a preliminary step of registering the user entity with a management entity, in which the user entity obtains at least one element from the management entity, said element being used to generate the first signature. This allows linking the first signature to the group managed by the management entity.

Preferably, this element is a certificate generated by the management entity as a function of a random number generated by the user entity. This allows linking the first signature to the particular user entity within the group managed by the management entity.

Advantageously, the management entity provides the certificate to the identifying entity and the identification of the user entity is done using at least a part of the certificate, a secret key specific to the identifying entity, and at least a part of the second signature. The identification of the user entity can therefore only be made by the identifying entity.

The invention also proposes a cryptographic system comprising at least one user entity and a checking entity and an identifying entity, and able to implement the above method. Such a system preferably comprises a management entity.

The method of the invention will be better understood by reading the following description and examining the drawings, in which.

Figure 1:
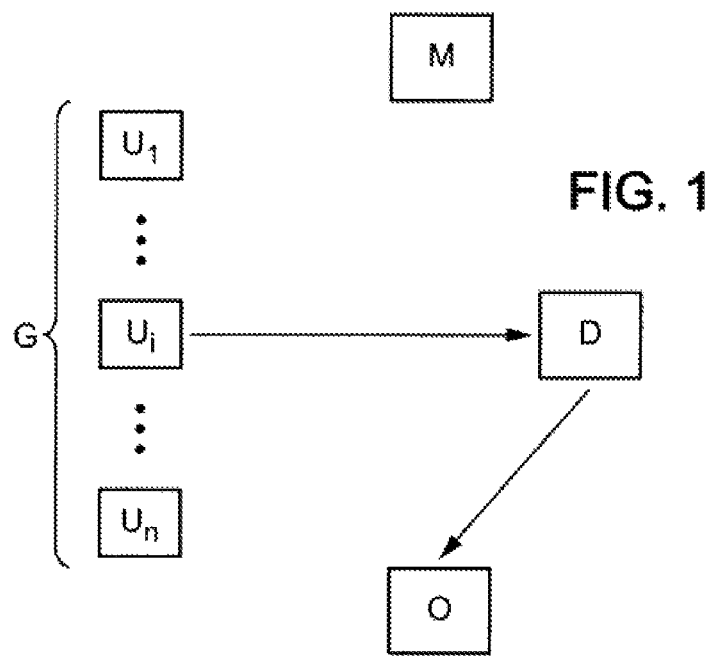
FIG. 1 is a block diagram illustrating a cryptographic exchange system used by the invention.

We will first refer to FIG. 1, which illustrates a cryptographic exchange system of the invention.

In this FIG. 1, a plurality of user entities U1, ..., $U_i$, ..., Un form a group G of users. These entities $U_i$ can be authenticated by a checking entity D, with the goal for example of providing a service requested by a message sent by the entity $U_i$. The service must be rendered while respecting the privacy of the entity $U_i$, meaning that the entity $U_i$ must access the service in an anonymous manner and it must not be possible for a third party to trace the use of the service by the entity $U_i$. This message must not reveal the identity of the unit $U_i$ in order to maintain its anonymity.

The system also has an identifying entity O. Its function is to identify the user entity $U_i$, for example for the purposes of invoicing for the service provided by the checking entity D, without the identifying entity O knowing the nature of this service.

Lastly, the system can comprise a management entity M, which has the role of initializing the parameters and other public or secret keys necessary to the method of the invention and assigned to the entities D and O, and also of registering the entities $U_i$ in the user group G.

The different entities presented above must be able to perform a certain number of cryptographic computations. To do this, such entities can comprise computation means such as a processor, a microprocessor, or any other means which allow performing a computation or generating a random value.

Figure 2:
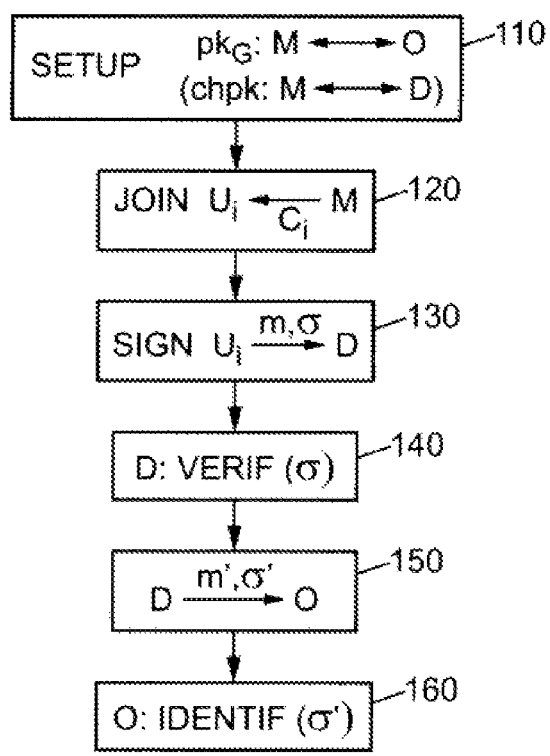
FIG. 2 illustrates the steps of the cryptographic method of the invention.

We will now refer to FIG. 2 which illustrates the general principle of a cryptographic method of the invention.

During a first initialization step 110, the management entity M exchanges, on the one hand, data with the identifying entity O in order to define a group public key $pk_G$. The management entity M can also, on the other hand, exchange data with the checking entity D in order to define a secondary public key chpk, for example an assigned public key or a chameleon function public key for which the corresponding secret key could be held by D.

Once the system is initialized, a user entity $U_i$ can then register with the management entity M during a registration step 120. To do this, the user entity $U_i$ obtains, by means of a secret element $x_i$ known only to the user entity $U_i$, the means of producing a group signature by interacting with the group manager M and obtaining a certificate $C_i$ from it.

In a particular embodiment in which an ACJT group signature scheme (for Ateniese, Camenish, Joye and Tsudik) is used, this registration step 120 can consist of the user entity $U_i$ generating a private signature key $x_i$ and interacting with the management entity M in order to obtain a corresponding certificate $C_i$. The private key and the certificate $C_i$ are both linked to a public key specific to the group and common to all members of the group. Only the management entity M for the group, possessing a specific secret key (p', q'), is able to issue a member certificate but it does not know the private key of the members, such that this entity M cannot sign in place of a user entity. The management entity M is also able to establish the link between the certificate $C_i$ provided and the actual identity of the member.

The user entity $U_i$ can then send a message m and a signature a based on this message m to the checking entity D during a signature step 130, for example for the purposes of requesting a service from this entity D.

Then, during an authentication step 140, the user unit $U_i$ is authenticated by verification of the group signature with the message m. This step does not allow the checking entity D to identify the user entity $U_i$ in the group G, which preserves the anonymity of the user entity. If a service is requested and the authentication succeeds, the requested service can be provided to the entity $U_i$.

During a next step 150, a second signature σ' is sent by the checking entity D to an identifying entity O. Such a signature σ' depends on the user unit $U_i$, for example on a part $A_i$ of its certificate $C_i$, and allows the identifying entity O to identify the user unit $U_i$ during a step 160, to allow for example sending it an invoice without knowing the service that the user entity U, has requested of the checking entity D.

This second signature σ' can be generated in the entity D from the first signature σ, or generated in the entity $U_i$ from the first signature σ and sent by the entity D. During this step 150, a second message m' can also be sent from the entity D to the entity O, for verification of the second signature σ'.

Figure 3A:
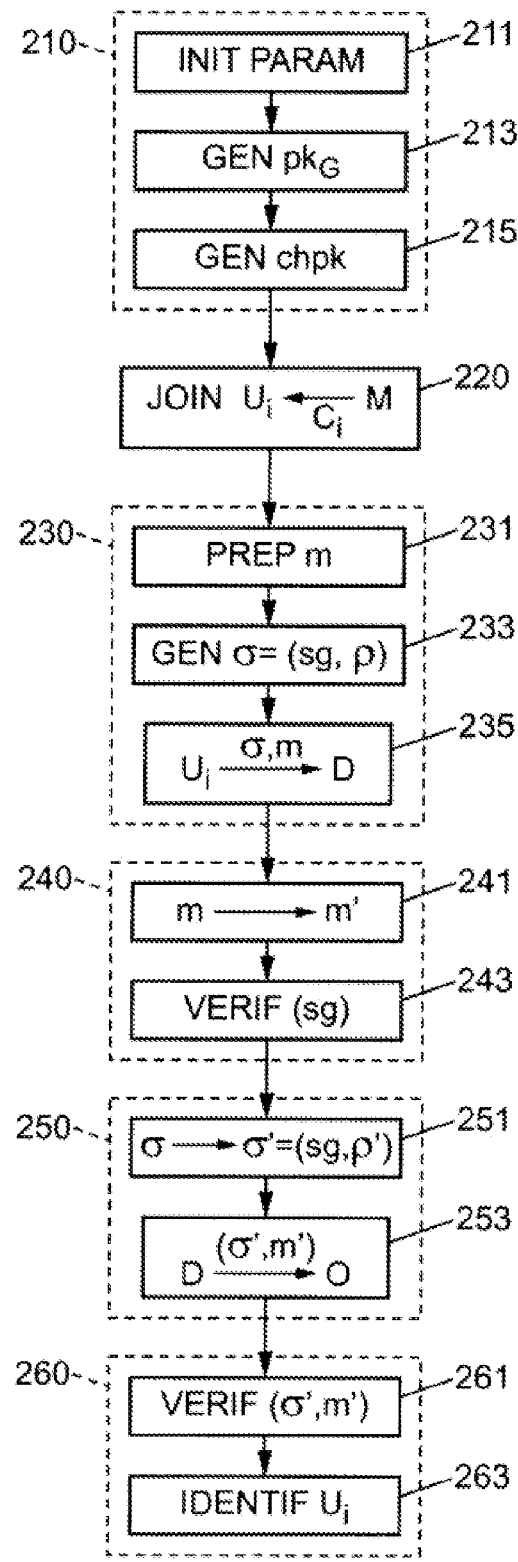
FIG. 3A illustrates the steps of a method according to a first embodiment of the invention.

We will now refer to FIG. 3A, which illustrates a cryptographic method according to a first embodiment of the invention.

In this first embodiment, it is the checking entity D which knows the invoicing level related to a service requested by the entity $U_i$ and which will therefore modify a message received from the entity $U_i$, before transferring it to the identifying entity O which carries out the invoicing, in order to hide the part indicating the requested service by a part indicating an invoicing level.

The method according to the first embodiment can comprise a first initialization step 210 subdivided into a first sub-step 211 of initializing the parameters of the system, a second sub-step 213 of generating the group public key $pk_G$, and a third sub-step 215 of generating the public key of the chameleon hash function chpk.

During the first sub-step 211 in which parameters are initialized, the entity M first initializes the security parameters of the system $\epsilon > 1$, $k$, $l_p$ for the group signature as well as a security parameter $\lambda$, possibly equal to k, for the assigned signature part.

Then, during the second sub-step 213, the group public key $pk_G$ is generated by cooperation between the entities M and O, in the following manner:
1. The entity M calculates the public parameters necessary for the cryptographic scheme:
   $\lambda_1, \lambda_2, \gamma_1, \gamma_2$ lengths such that $\lambda_1 > \epsilon(\lambda_2+k)+2$, $\lambda_2 > 4l_p$, $\gamma_1 > \epsilon(\gamma_2+k)+2$ and $\gamma_2 > \lambda_1+2$;
   the intervals $\Lambda = ]2^{\lambda_1}-2^{\lambda_2}+2^{\lambda_2}+2^{22}$ [ and $\Gamma = ]2^{\gamma_1}-2^{\gamma_2}+2^{\gamma_2}$ [;
   H: $\{0,1\}^* \to \{0,1\}^k$ a collision resistant hash function.
2. The entity M then calculates a part of the public key for the group signature based on its secret key pair (p', q'):
   p, q of size $l_p$ are chosen such that $p=2p'+1$, $q=2q'+1$ are prime numbers and $n=pq$ is calculated.
   Then the variables $a, a_0, g, h \in QR(n)$ are chosen randomly (where QR(n) is the quadratic residue modulo n).
3. The identifying entity O then generates a secret key x and the corresponding public value y:
   A secret key x is chosen randomly in $Z^*_{p'q'}$.
   y is calculated using $y=g^x$ mod n.
The public key for the group is then:

$$pk_G = (n, a_0, a, y, g, h)$$

Lastly, during the third sub-step 215, a chameleon hash function public key chpk is generated by cooperation between the entities M and D, as follows:
1. The management entity M calculates the following cryptographic parameters necessary for the cryptographic scheme:
   a collision resistant hash function H': $\{0,1\}^* \to \{0,1\}^\lambda$ which is potentially the same as the function H used for the group signature;
   a chameleon hash function scheme CH composed of the three following algorithms:
     The "Setup" algorithm which generates a pair of keys (chpk,chsk) linked to the instance of the scheme as a function of the input $1^\lambda$;
     The "Proceed" algorithm which returns a hash value h for a message $m \in \{0,1\}^*$ as a function of said message, of the public key of the instance chpk, and of a random variable $r \in \{0,1\}^\lambda$.
     The "Forge" algorithm which returns a new random variable r' as a function of the secret key of the chameleon function chsk, of a triplet composed of the message m', the random variable r, and the hash value h, and of a new message m'. This new random variable r' verifies that the hash value h issuing from the "Proceed" algorithm applied to m, r and chpk is the same as the hash value issuing from the "Proceed" algorithm applied to m', r' and chpk:

$$\text{Proceed}(m, r, chpk) = \text{Proceed}(m', r', chpk)$$

2. As for the checking entity D, it generates a pair of keys for the chameleon function (chpk,chsk) using the "Setup" algorithm as defined above.

The initialization step 210 therefore allows obtaining a pair of signature public keys ($pk_G$,chpk) from the secret key (p',q') of the management entity M, the secret key x of the identifying entity O, and the secret key chsk of the chameleon function generated by the checking entity D.

Note that the user entity $U_i$ is not involved at this stage of the method because, from the point of view of the group signature, it is not yet registered as a group member and, from the point of view of the assigned signature, this entity $U_i$ does not have a pair of keys to generate because it will use the pair of public signature keys ($pk_G$,chpk).

The users $U_i$ can then register with the management entity M to join the user group G during the registration step 220. At the end of this step 220, the user obtains a secret $x_i$ known only to him, as well as a certificate $C_i$ of membership in the group in order to be able to generate assigned group signatures for any message. The identifying entity O has, in its database, the means of identifying the signatures of the user entity $U_i$.

This registration step 220 can take place as follows:
1. The entity $U_i$ randomly selects a secret value $\overline{x_i}$ in $]0, 2^{\lambda_2}[$ and sends to the management entity M a commitment $$C_1 = g^{\overline{x_i}} h^r$$

mod n where r is randomly chosen in $]0, n^2[$, as well as a proof $pok_1$ that the commitment is properly constructed.
2. The entity M takes two random variables $\alpha_i, \beta_i$ from $]0, 2^{\lambda_2}[$ and sends them to the entity $U_i$.
3. The entity $U_i$ constructs its secret $x_i = 2^{\lambda_1} + (\alpha_i \overline{x_i} + \beta_i \mod 2^{\lambda_2})$ and sends $C_2 = a^{x_i}$ mod n as well as a proof $pok_2$ of its proper construction.
4. The entity M can now create the certificate for the entity $U_i$, meaning a signature for the commitment $C_2$. To do this, it randomly selects $e_i$ from $\Gamma$ and calculates $A_i = (C_2 a_0)^{1/e_i}$ mod n using the knowledge of p' and q'.
5. The entity M provides $\{U_i, A_i, e_i\}$ to the identifying entity O for storage, as well as the certificate $C_i = \{A_i, e_i\}$ to the user entity $U_i$.
6. Lastly, the entity $U_i$ verifies its certificate $C_i$, by checking whether $a^{x_i} a_0 = A_i^{e_i}$ mod n.

At the end of this registration step 220, the user entity $U_i$ is provided with a secret $x_i$ and a certificate $C_i = \{A_i, e_i\}$ which are specific to it. It can then sign any message m using this information.

In the example considered, the message m is a request for service to the access provider represented by the checking entity D. A variable $\alpha$ is included in the message m to be sent, for noting the exact description of the requested service. This variable $\alpha$ is intended to be modified by the checking entity D, which substitutes substitution data in its place comprising, or possibly constituting, an invoice code C in this first embodiment.

The step 230 described below is primarily divided into a first sub-step 231 of preparing a message m so that it is modifiable by the checking entity D, and a second sub-step 223 of generating a first signature $\sigma$ based on the group signature sg and a random number $\rho$.

The first sub-step 231 of preparing the message can be done as follows:
1. The message $m \in \{0,1\}^*$ is split into $m = m_d \| \alpha \| m_f$, where $\|$ represents the concatenation. The part $\alpha$ of the message m serves, on the one hand, to indicate to the checking entity D the type of service desired and is, on the other hand, modifiable by this entity D for the purposes of obtaining a message m' which does not allow another entity, particularly the identifying entity O, to know the type of service requested. On the other hand, the parts $m_d$ and $m_f$ are not modifiable by the checking entity D (nor by anyone else).

2. Then ρ is randomly chosen in $\{0,1\}^\lambda$ log and a modified part α' is calculated using the "Proceed" algorithm such that α'=Proceed (α,ρ,chpk).

3. The modified part α' is then concatenated between the unmodified parts $m_d$ and $m_f$ and the hash function H' is applied to this concatenation, using the relation m'=H' $(m_d\|\alpha'\|m_f)$.

At the end of this first sub-step 231, a modified message m' is obtained in which the part α identifying the type of service requested by the entity $U_i$ is formatted to allow the use of the message m' in the signature algorithm The second sub-step 233 of generating a first signature a can be done as follows, in the user entity:

1. A value w is randomly selected from $\{0,1\}^{2l_p}$

2. The values $T_1$, $T_2$ and $T_3$ are calculated using the following formulas:

$$T_1 = A_i y^w \bmod n$$

$$T_2 = g^w \bmod n$$

$$T_3 = g^{e_i} h^w \bmod n$$

3. The values $r_1$, $r_2$, $r_3$ and $r_4$ are randomly selected such that $r_1 \in \pm\{0,1\}^{\epsilon(\gamma_2+k)}$, $r_2 \in \pm\{0,1\}^{\epsilon(\gamma_2+k)}$, $r_3 \in \pm\{0,1\}^{\epsilon(\gamma_1+2l_p+k+1)}$, and $r_4 \in \pm\{0,1\}^{\epsilon(2l_p+k)}$.

4. The values $d_1$, $d_2$, $d_3$ and $d_4$ are calculated using the following formulas:

$$d_1 = T_1^{r_1}/(a^{r_2} y^{r_3}) \bmod n$$

$$d_2 = T_2^{r_1}/g^{r_3} \bmod n$$

$$d_3 = g^{r_4} \bmod n$$

$$d_4 = g^{r_1} h^{r_4} \bmod n$$

5. A value c is generated by applying the hash function to a concatenation of values according to the following formula:

$$c = H(g\|h\|y\|a_0\|a\|T_1\|T_2\|T_3\|d_1\|d_2\|d_3\|d_4\|m')$$

6. The values $s_1$, $s_2$, $s_3$ and $s_4$ are calculated using the following formulas:

$$s_1 = r_1 - c(e_i - 2^{\gamma_1})$$

$$s_2 = r_2 - c(x_i - 2^{\lambda_1})$$

$$s_3 = r_3 - c e_i w$$

$$s_4 = r_4 - c w$$

7. The group signature sg is generated using the following formula:

$$sg = (c, s_1, s_2, s_3, s_4, T_1, T_2, T_3).$$

Thus, at the end of the sub-step 233, a first signature σ is obtained, defined for m, such that σ=(sg,ρ). This first signature σ and the corresponding message m are sent to the checking entity D during a transmission step 235.

Any entity knowing a pair (m,σ), as well as the public key for the group pkG and the public key of the chameleon function chpk, can verify the validity of the signature during a verification step 240. This verification can be done in the same manner as during the verification of a conventional assigned signature, with the difference that in the present invention, the verification is not applied to a conventional signature (such as RSA) but to the chosen group signature.

Such a verification step 240, in the first embodiment of the invention, is done by the verifying unit D and is subdivided into a first sub-step 241 of reconstructing the signed message m' and a second sub-step 243 of verifying the group signature sg, using m'.

The first sub-step 241 of reconstructing the signed message m' can be done in the following manner:

1. The first signature a received from the entity $U_i$ is broken down into the group signature sg and the random value ρ.

2. The message m received from the entity $U_i$ is broken down into $m = m_d\|\alpha\|m_f$, in order to find the part α.

3. The modified part α' is calculated by applying the "Proceed" algorithm such that α'=Proceed (α,ρ,chpk).

4. The modified part α' is then concatenated between the unmodified parts $m_d$ and $m_f$ and the hash function H' is applied to this concatenation, using the relation m'=H' $(m_d\|\alpha'\|m_f)$ which allows recalculating the formatted message m'.

The second sub-step 243 of verifying the group signature sg is done as follows:

1. sg is broken down into the values c, $s_1$, $s_2$, $s_3$, $s_4$, $T_1$, $T_2$, $T_3$.

2. The values $d_1'$, $d_2'$, $d_3'$ and $d_4'$ are calculated using the following formulas:

$$d_1' = a_0^c T_1^{s_1 - c 2^{\gamma_1}}/(a^{s_1 - c 2^{\gamma_1}} y^{s_3}) \bmod n$$

$$d_2' = T_2^{s_1 - c 2^{\gamma_1}}/g^{s_3} \bmod n$$

$$d_3' = T_2^c g^{s_4} \bmod n$$

$$d_4' = T_3^c g^{s_1 - c 2^{\gamma_1}} h^{s_4} \bmod n$$

3. A value c' is generated by applying the hash function H to a concatenation of values according to the following formula:

$$c' = H(g\|h\|y\|a_0\|a\|T_1\|T_2\|T_3\|d_1'\|d_2'\|d_3'\|d_4'\|m')$$

4. The signature is considered to be accurate, and the authentication by the checking entity D validated, if and only if the following conditions are met:

$$c = c'$$

$$s_1 \in \pm\{0,1\}^{\epsilon(\gamma_2+k)+1}$$

$$s_2 \in \pm\{0,1\}^{\epsilon(\lambda_2+k)+1}$$

$$s_3 \in \pm\{0,1\}^{\epsilon(\gamma_1 2l_p + k + 1)+1}$$

$$s_4 \in \pm\{0,1\}^{\epsilon(2l_p+k)+1}$$

If the authentication is positive, the checking entity D can then provide the desired service to the requesting user entity.

For invoicing for the service, it is important that the entity performing the invoicing, i.e. the identifying entity O in the present invention, has no knowledge of the type of service requested, which means it cannot have access to the value α.

As the checking entity D knows the secret key for the chameleon hash function chsk, it can be used as a modification trapdoor when a pair consisting of the message m and the first signature σ is received, and is able to modify certain parts of the message m authorized for modification, including replacing the part α indicating the requested service with substitution data corresponding to, or comprising, an invoice code C.

This modification is made such that if the anonymity of the signature is lifted, it will still be the entity $U_i$ which will be identified as the initial signer.

Such a modification is made during the conversion step 250, and can be done using the assigned secret key chsk. To do this, the step 250 comprises a sub-step 251 allowing the generation of a new random variable ρ' as follows:
1. The first signature σ received from the entity $U_i$ is broken down into the group signature sg and the random value ρ.
2. The message m received from the entity $U_i$ is broken down into $m=m_d\|\alpha vm_f$ in order to obtain the part α.
3. The hash value α' is calculated applying the algorithm "Proceed" such that α'=Proceed(α,ρ,chpk).
4. A new random variable ρ' is calculated by applying the "Forge" algorithm using the secret key of the chameleon function chsk and the part C introduced by the entity D, according to the following formula:

$$\rho'=\text{Forge}(chsk,(\alpha,\rho,\alpha'),C)$$

A second signature σ'=(sg, ρ') is thus obtained at the end of the sub-step 251, in the checking entity D, and is sent to the identifying entity O during a transmission step 253, for example for invoicing requirements.

The principle of a group signature is that in case of conflict, a "Judge" entity can revoke the anonymity of the group signature. The identifying entity O uses this property, during an identification step 260, to allow the invoice service to know the identity of the user entity which is a customer of the service. Such an identification step 260 is part of the "Open" protocol of the chosen Group signature, which here is ACJT, and comprises a step 263 of lifting the anonymity in the following manner:
1. The part $A_i$ of the certificate $C_i$ of the entity $U_i$ is found by calculating:

$$A_i=T_1/T_2^x \bmod n.$$

2. It is proven that the operation executed properly by verifying that:

$$\log_g y = \log_{T_2}(T_1/A_i \bmod n).$$

This step 263 can be preceded by a step 261 of verifying of the second signature σ', similar to the verification 240 but using the second signature σ' and the message $m'=m_d\|C\|m_f$ sent by the entity D to the entity O during the transmission step 253.

Thus, the identifying entity O has found which entity $U_i$ in the group is the author of the message m, and can prove it if applicable, for example if the user entity $U_i$ is contesting the invoice. As a result it can send an invoice without knowing the service performed by the entity D. In this first embodiment, it is the checking entity D which inserts the substitution data comprising the invoice code C.

One can see here that only the identifying entity O can find the part A of the certificate $C_i$, because only this entity O knows the secret key x used during the step 263. The checking entity D, although it knows $T_1$ and $T_2$ which are present in the first signature σ, is incapable of performing the operation of step 263, which guarantees the anonymity of the user.

Figure 3B:
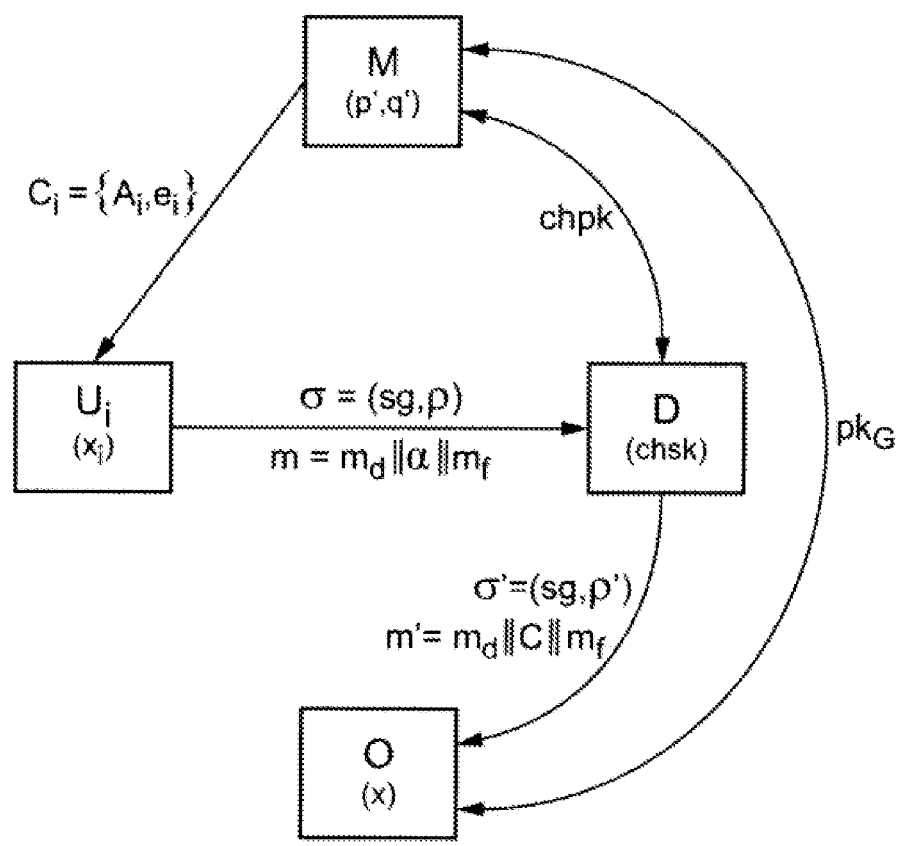
FIG. 3B illustrates the exchanges in the cryptographic system during the execution of the method according to a first embodiment of the invention.

FIG. 3B illustrates the data exchanges occurring between the entities of the cryptographic system when using the method according to a first embodiment of the invention.

In this FIG. 3B, one can clearly see that the first signature σ and the first message m are sent from the entity $U_i$ to the checking entity D, where they are modified and resent to the identifying entity O in the form of a second signature σ' and a second message m'.

Figure 4A:
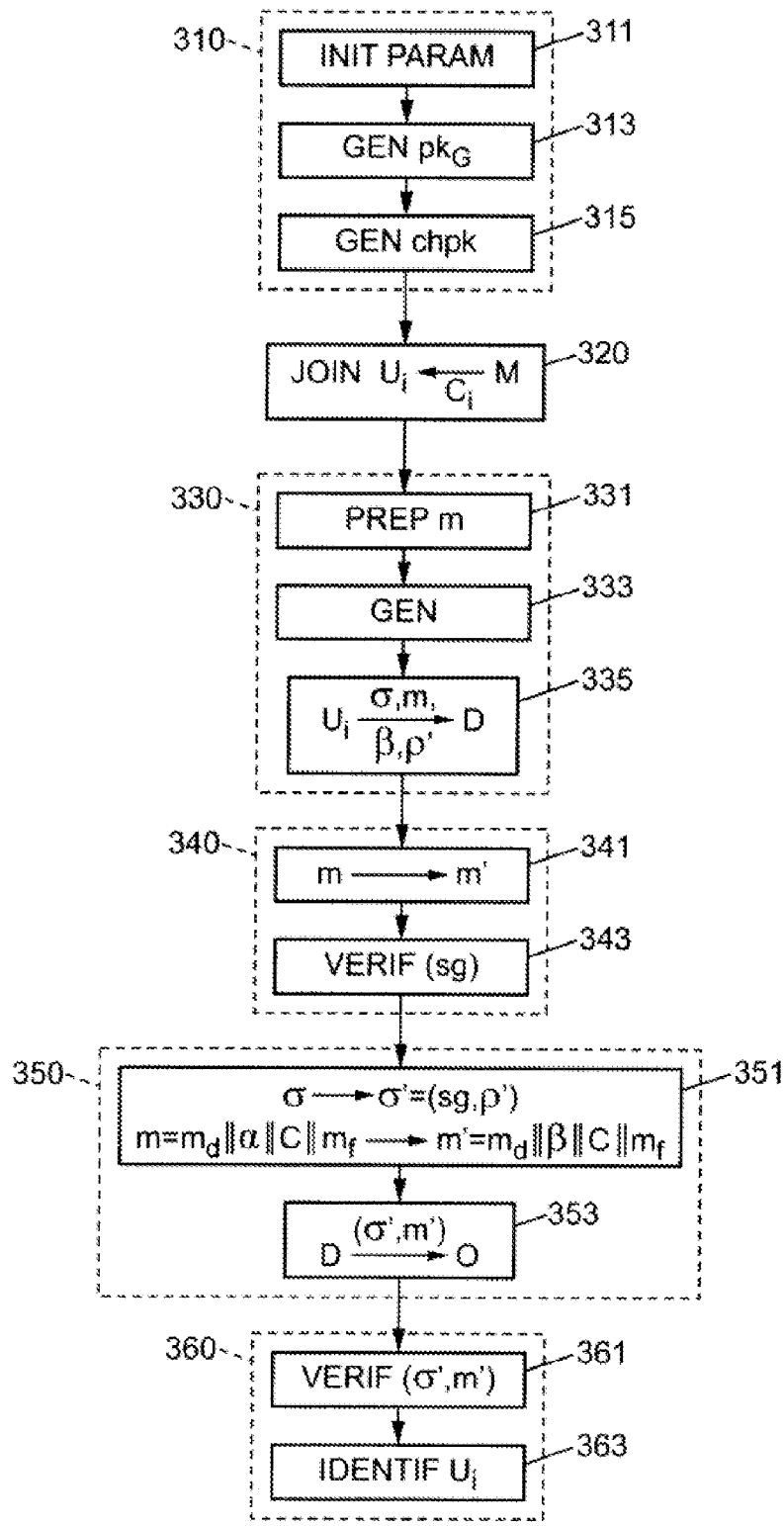
FIG. 4A illustrates the steps of a method according to a second embodiment of the invention.

We will now refer to FIG. 4A, which illustrates a cryptographic method according to a second embodiment of the invention, this time using what is called a "redactable" signature, for example based on the chameleon function.

In this second embodiment, it is the user entity $U_i$ which knows the invoicing level related to a service that it requests from the checking entity D. This entity $U_i$ will therefore send a message comprising a part indicating the requested service and a part indicating the invoicing level corresponding to the entity D. In order to protect the anonymity concerning the provided service, the entity D then hides the part indicating the requested service in the message, using substitution data β, and transfers the modified message which still comprises a part indicating the invoicing level, to the identifying entity O performing the invoicing.

In this second embodiment, the initialization step 310 is subdivided into three sub-parts 311, 313 and 315. The steps of initializing the parameters 311 and generating the group public key 313 are respectively similar to steps 211 and 213. During the third sub-step 315, the user entity $U_i$ performs the initialization of the redactable signature and, for example, generates a key pair (chpk, chsk) in the following manner:
1. It calculates the public parameters necessary for the scheme:
   Let H': $\{0,1\}^* \to \{0,1\}^\lambda$ be a collision resistant hash function (potentially the same as for the group signature);
   Let CH be a chameleon hash function scheme composed of the three following algorithms:
   1. Setup generates the pair of keys (chpk,chsk) linked to the schema instance as a function of the input $1^\lambda$;
   2. Proceed takes as input a message $m\in\{0,1\}^*$, the public key for the instance chpk, and a random variable $r\in\{0,1\}^\lambda$, and returns the hash h of the message m as a function of the random variable r;
   3. Forge takes as input the secret key of the chameleon function chsk, a triplet (message, random variable and corresponding hash) (m, r, h), and a new message m'. It returns a new random variable r' such that:

$$\text{Proceed}(m,r,chpk)=\text{Proceed}(m',r',chpk)$$

2. It generates a pair of keys for the chameleon function (chpk,chsk) using the algorithm CH.Setup.

The join step 320 is similar to the step 220 in the first embodiment described above.

This second embodiment is distinguished by the signature step 330 which is subdivided into a first sub-step 331 of preparing the message m to render it redactable by the checking entity D, and a second step 333 of generating a first signature σ based on the group signature sg and a random number ρ.

The first sub-step 331 of preparing the message can be done as follows:
1. The message $m\in\{0,1\}^*$ is split into $m=m_d\|\alpha\|C\|m_f$, where $\|$ represents the concatenation. The first part α of the message m serves to indicate to the checking entity D the type of service desired, and the second part C of the message m serves to indicate the invoicing level associated with this service.
2. Then ρ is randomly chosen in $\{0,1\}^\lambda$ log and a modified part α' is calculated using the "Proceed" algorithm such that α'=Proceed (α,ρ,chpk).
3. The modified part α' is then concatenated between the unmodified parts $m_d$, C and $m_f$ and the hash function H' is applied to this concatenation according to the relation $m'=H'(m_d\|\alpha'\|C\|m_f)$.
4. Then β is randomly chosen in $\{0,1\}^\lambda$ log. This value β can be used as a redacted version of α, as substitution data in the checking entity D, and can be such that, for example, β=$, where the symbol $ indicates that this part of the initial message has been eliminated.

5. A new random variable ρ' corresponding to β is calculated by applying the "Forge" algorithm using the following formula:

$$\rho' = \text{Forge}(chsk,(\alpha,\rho,\alpha'),\beta)$$

At the end of this first sub-step, a modified message m' is obtained in which the part α identifying the type of service requested by the entity $U_i$ is no longer accessible.

The second sub-step 333 of generating a first signature σ in the user entity $U_i$, is identical to the generation second step 233 described above.

Thus, at the end of this sub-step 333, a part of a first signature σ is obtained, defined for m, such that σ=(sg, ρ), as in sub-step 233. However, here the values β and ρ' are also obtained. These values β and ρ', as well as the first signature σ and the message m, are sent to the checking entity D, which will make use of these values β and ρ' to redact the message m that it receives.

Any entity knowing a pair (m,σ), as well as the group public key pkG and the public key of the chameleon function chpk, can verify the accuracy of the signature during a verification step 340. This verification can occur in the same manner as for the verification of a standard redactable signature, with the difference that in the present invention, the verification is applied not to the standard signature, but to the corresponding group signature.

Such a verification step 340, in the second embodiment of the invention, is performed by the verifying unit D and is subdivided into a first sub-step 341 of reconstructing the signed message m' and a second sub-step 343 of verifying the group signature sg, using m'.

The first sub-step 341 of reconstructing the signed message m' can take place as follows:
1. The first signature a received from the entity $U_i$ is broken down into the group signature sg and the random value ρ.
2. The message m received from the entity $U_i$ is split into m=$m_d$‖α‖C‖$m_f$.
3. The modified part α' is calculated by applying the "Proceed" algorithm such that α'=Proceed(α,ρ,chpk).
4. Then the modified part α' is concatenated between the unmodified parts $m_d$ and $m_f$ and the hash function H' is applied to this concatenation, according to the relation m'=H'($m_d$‖α'‖C‖$m_f$) which yields the message m'.

The second sub-step 343 for verifying the group signature sg takes place in the following manner, similar to the verification step 243 in the first embodiment:
1. sg is broken down into the values c, $s_1$, $s_2$, $s_3$, $s_4$, $T_1$, $T_2$, $T_3$.
2. The values $d_1'$, $d_2'$, $d_3'$ and $d_4'$ are calculated using the following formulas:

$$d_1' = a_0^c T_1^{s_1-c2^{\gamma_1}}(a^{s_2-c2^{\lambda_1}}y^{s_3}) \bmod n$$

$$d_2' = T_2^{s_1-c2^{\gamma_1}}/g^{s_3} \bmod n$$

$$d_3' = T_2^c g^{s_3} \bmod n$$

$$d_4' = T_3^c g^{s_1-c2^{\gamma_1}} h^{s_4} \bmod n$$

3. A value c' is generated, by applying the hash function H to a concatenation of values according to the following formula:

$$c = H(g\|h\|y\|a_0\|a\|T_1\|T_2\|T_3\|d_1\|d_2\|d_3\|d_4\|m')$$

4. The signature is considered to be correct, and the verification validated by the checking entity D, if and only if the following conditions are met:

$$c = c'$$

$$s_1 \in \pm\{0,1\}^{\epsilon(\gamma_2+k)+1}$$

$$s_2 \in \pm\{0,1\}^{\epsilon(\lambda_2+k)+1}$$

$$s_2 \in \pm\{0,1\}^{\epsilon(\gamma_1+2l_p+k+1)+1}$$

$$s_2 \in \pm\{0,1\}^{\epsilon(2l_p+k)+1}$$

If the verification is positive, the checking entity D can then provide the desired service to the requesting user entity $U_i$ without knowing its identity.

As the checking entity D has received the random variable ρ', it is able to use it as a deletion trapdoor for deleting the part of the message m received from the entity $U_i$ and comprising the description of the requested service. In other words, the entity D can make use of ρ' to delete the part α of the message m such that if the anonymity of the signature is lifted, it will always be the initial signer $U_i$ who is found.

Such a deletion occurs during a deletion step 350, and can take place using the assigned public key chpk. To do this, the step 350 comprises a sub-step 351 as follows:
1. The first signature σ received from the entity $U_i$ is subdivided into the group signature sg and the random value ρ.
2. The message m received from the entity $U_i$ is split into m=$m_d$‖α‖C‖$m_f$ in order to obtain the part α.
3. It is verified that the hash value h of the part α obtained by the "Proceed" algorithm" is identical to the hash value h' of the value β obtained by this same algorithm, which is the same as satisfying the following relation:

$$\text{Proceed}(\alpha,\rho,chpk) = \text{Proceed}(\beta,\rho',chpk).$$

4. If the hash values h and h' are identical (i.e. if the above relation is satisfied), the message m is modified by replacing the part α with the substitution data β, in order to obtain a redacted message m' such that m'=$m_d$‖β‖C‖$m_f$.

A second modified signature σ'=(sg, ρ') and a second redacted message m' are thus obtained at the end of the sub-step 351, in the checking entity D, and can be sent to the identifying entity O during a transmission step 353, for invoicing requirements.

Upon receiving m' and σ'=(sg, ρ'), the identifying entity O will then find the identity of $U_i$ in an identification step 360, in order to allow invoicing the user entity which is a customer of the service. Again, such an identification step 360 is part of the "Open" protocol of the group signature chosen, ACJT in this case, and comprises a step 363 of lifting the anonymity which is done as follows:
1. The part $A_i$ of the certificate $C_i$ of the entity $U_i$ is found by calculating:

$$A_i = T_1/T_2^x \bmod n.$$

$U_i$
2. It is proven that the operation executed successfully by verifying that:

$$\log_g y = \log_{T_2}(T_1/A_i \bmod n).$$

This step 363 can be preceded by a step 361 in which the validity of the signature is verified, similar to the step 340.

Thus the identifying entity O has found which entity $U_i$, in the group is the author of the message m and can prove it if necessary. As a result it can send it an invoice without knowing the service performed by the entity D.

Figure 4B:
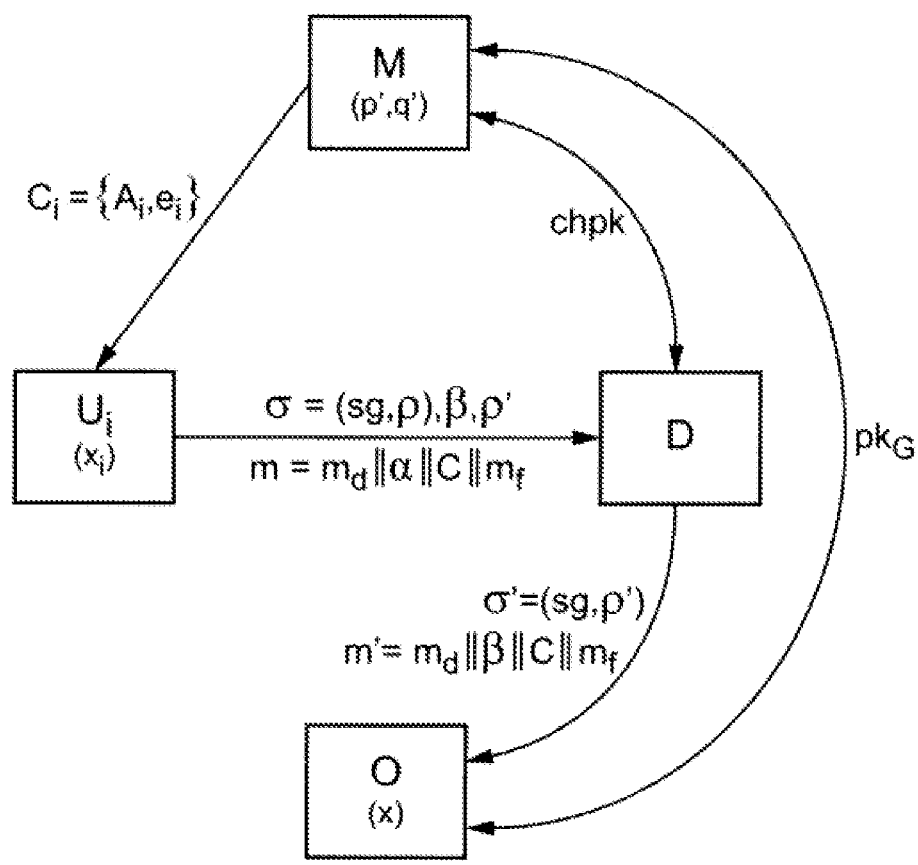
FIG. 4B illustrates the exchanges in the cryptographic system during the execution of the method according to a second embodiment of the invention.

FIG. 4B illustrates the data exchanges which take place between the entities of the cryptographic system when using the method according to a second embodiment of the invention.

In this FIG. 4B, one can clearly see that the first signature σ and the first message m, as well as the numbers β and ρ', are sent from the entity $U_i$ to the checking entity D, which uses the numbers β and ρ' to generate a second signature σ' and a second message m' transmitted to the identifying entity O.

Figure 5A:
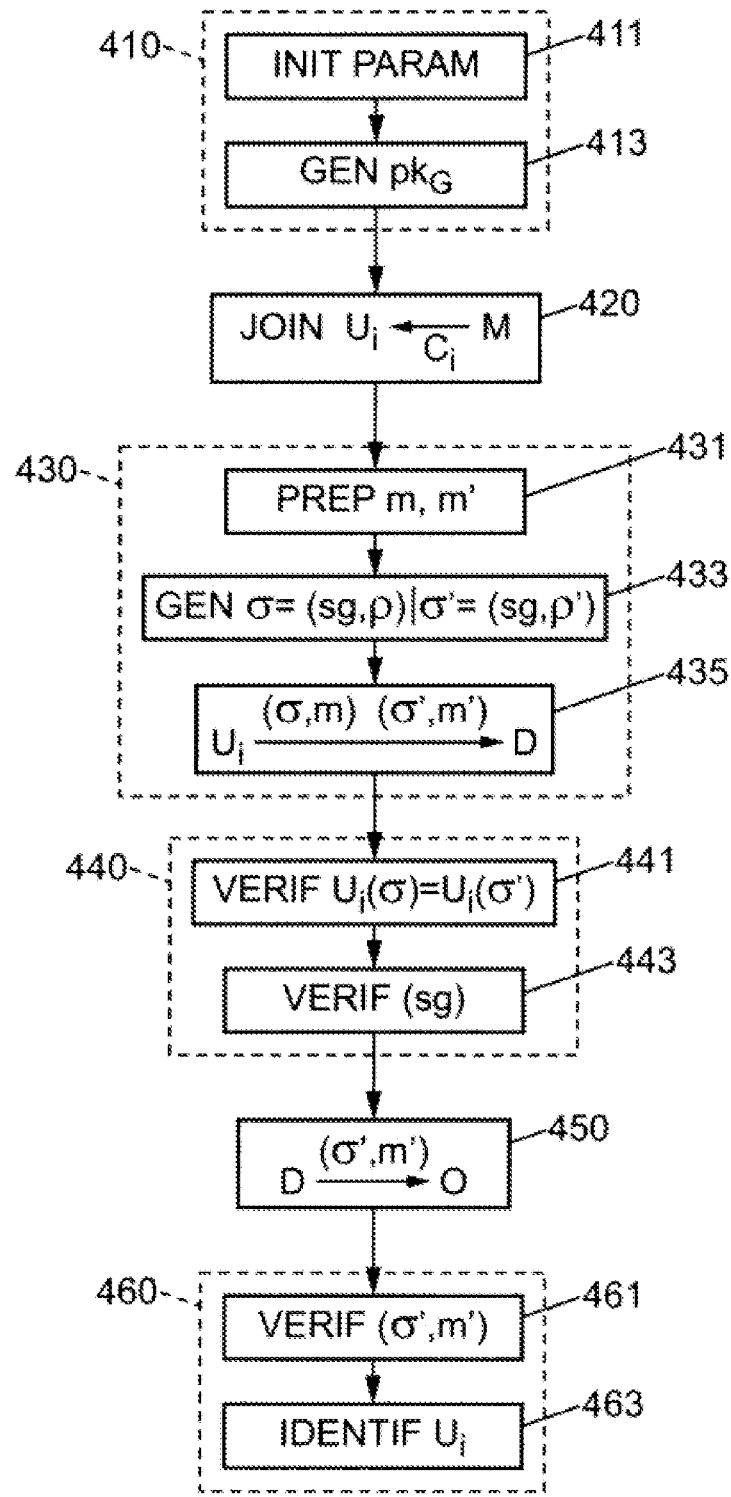
FIG. 5A illustrates the steps of a method according to a third embodiment of the invention.

We will now refer to FIG. 5A, which illustrates a cryptographic method according to a third embodiment of the invention, in which the signature and the message intended for the identifying entity O are prepared in the user entity $U_i$ and not in the checking entity D.

In this third embodiment, the initialization step 410 may only consist of a sub-step 411 of initializing parameters and a sub-step 413 of generating a public key, respectively similar to the steps 211, 311 and 213, 313 described above. As the user entity $U_i$ manages the signature and the message intended for the identifying entity O, a step of generating the assigned signature is not required.

The registration step 420 is similar to the steps 220 and 320 of the first and second embodiments described above.

This third embodiment is distinguished by the signature step 430 which comprises a first sub-step 431 of preparing two messages m and m', and a second step 433 of generating two signatures σ and σ'.

The first sub-step 431 consists of preparing two messages m and m' according to the following procedure:
1. A first message m∈{0,1}* is split into m=$m_d$∥α∥$m_f$, where ∥ the part α of the message m serves to indicate to the checking entity D the type of service desired.
2. A second message m'∈{0,1}* is split into m=$m_d$∥C∥$m_f$, where the part C of the message m' serves to indicate to the identifying entity O the invoicing level associated with the desired service.

The second sub-step 433 consists of generating two signatures σ and σ', on the basis of the messages m and m', in a manner similar to the sub-steps 233 or 333 described above.

In particular, the first signature a corresponds to a group signature sg, generated from the message m in the following manner:
1. A value w is chosen randomly in $\{0,1\}^{2l_p}$
2. The values $T_1$, $T_2$ and $T_3$ are calculated using the following formulas:

$$T_1 = A_i y^w \bmod n$$

$$T_2 = g^w \bmod n$$

$$T_3 = g^{e_i} h^w \bmod n$$

3. The values $r_1, r_2, r_3$ and $r_4$ are randomly selected such that $r_1 \in \pm\{0,1\}^{\epsilon(\gamma_2+k)}, r_2 \in \pm\{0,1\}^{\epsilon(\lambda_2+k)}, r_3 \in \pm\{0,1\}^{\epsilon(\gamma_1+2l_p+k+1)}$ and $r_4 \in \pm\{0,1\}^{\epsilon(2l_p+k)}$.
4. The values $d_1, d_2, d_3$ and $d_4$ are calculated using the following formulas:

$$d_1 = T_1^{r_1}/(a^{r_2} y^{r_3}) \bmod n$$

$$d_2 = T_2^{r_1}/g^{r_3} \bmod n$$

$$d_3 = g^{r_4} \bmod n$$

$$d_4 = g^{r_1} h^{r_4} \bmod n$$

5. A value c is generated, by applying the hash function to a concatenation of values according to the following formula:

$$c = H(g\|h\|y\|a_0\|a\|T_1\|T_2\|T_3\|d_1\|d_2\|d_3\|d_4\|m)$$

6. The values $s_1, s_2, s_3$ and $s_4$ are calculated using the following formulas:

$$s_1 = r_1 - c(e_i - 2^{\gamma_1})$$

$$s_2 = r_2 - c(x_i - 2^{\lambda_1})$$

$$s_3 = r_3 - ce_i w$$

$$s_4 = r_4 - cw$$

7. The group signature is generated using the following formula:

$$sg = (c, s_1, s_2, s_3, s_4, T_0 T_2, T_3)$$

The second signature σ' corresponds to a group signature sg', generated from the message m' in the following manner:

$$c = H(g\|h\|y\|a_0\|a\|T_1\|T_2\|T_3\|d_1\|d_2\|d_3\|d_4\|m')$$

1. A value w' is randomly selected in $\{0,1\}^{2l_p}$
2. The values $T_1', T_2'$ and $T_3'$ are calculated using the following formulas:

$$T_1' = A_i y^{w'} \bmod n$$

$$T_2' = g^{w'} \bmod n$$

$$T_3' = g^{e_i} h^{w'} \bmod n$$

3. The values $r_1', r_2', r_3'$ and $r_4'$ are randomly selected such that $r_1' \in \pm\{0,1\}^{\epsilon(\gamma_2+k)}, r_2' \in \pm\{0,1\}^{\epsilon(\lambda_2+k)}, r_3' \in \pm\{0,1\}^{\epsilon(\gamma_1 2l_p+k+1)}$, and $r_4' \in \pm\{0,1\}^{\epsilon(2l_p+k)}$.
4. The values $d_1', d_2', d_3'$ and $d_4'$ are calculated using the following formulas:

$$d_1' = T_1'^{r_1'}/(a^{r_2'} y^{r_3'}) \bmod n$$

$$d_2' = T_2'^{r_1'}/g^{r_3'} \bmod n$$

$$d_3' = g^{r_4'} \bmod n$$

$$d_4' = g^{r_1'} h^{r_4'} \bmod n$$

5. A value c is generated, by applying the hash function to a concatenation of values according to the following formula:

$$c = H(g\|h\|y\|a_0\|a\|T_1\|T_2\|T_3\|d_1\|d_2\|d_3\|d_4\|m')$$

6. The values $s_1', s_2', s_3'$ and $s_4'$ are calculated using the following formulas:

$$s_1' = r_1' - c'(e_i - 2^{\gamma_1})$$

$$s_2' = r_2' - c'(x_i - 2^{\lambda_1})$$

$$s_3' = r_3' - c'e_i w'$$

$$s_4' = r_4' - c'w'$$

7. The group signature is generated using the following formula:

$$sg' = (c', s_1', s_2', s_3', s_4', T_1', T_2', T_3')$$

Thus, at the end of the sub-step 433, we obtain a first signature σ=sg defined for the message in, and a second signature σ'=sg' defined for the message m'. These signatures σ and σ', as well as the messages m and m', are sent to the checking entity D during a transmission step 435.

A step 440 of authenticating the user entity $U_i$ is then performed by the checking entity D. This comprises a first sub-step 441 of verifying the consistency of the two message/signature pairs and in particular the homogeneity of their origin. A second sub-step 443 then consists of verifying the group signature sg, using m'. This step is similar to the above step 243.

In the third embodiment, it is advantageous to be able to verify that the signatures σ and σ', and the messages m and m', originate from the same user $U_i$. To do this, the second group signature sg' can comprise an element common to it and to the first group signature sg. For example, sg' can be constructed as follows:

$$sg' = (c', s_1', s_2', s_3', s_4', T_1', T_2', T_3')$$

Thus a supplemental verification step 441 can be performed by the unit D, in order to ensure that sg and sg' comprise the common element $T_3$. It can also be possible for $U_i$ to prove that it knows, for example, one or more secret elements used to calculate both sg and sg' (for example $e_i$ for calculating $T_3$ and $T'_3$).

Once this first verification 441 is done, a step 443 of verifying the group signature sg can be performed in a manner similar to the above step 243, in order to determine whether the checking entity D provides or does not provide the desired service to the requesting user entity $U_i$, without knowing its identity.

The second signature σ' and the message m' are then sent to the identifying entity O during a transmission step 450, for the purposes of invoicing requirements.

The identifying entity O receiving σ' and m' can then find the identity of $U_i$ in an identification step 460 similar to the identification steps 260 or 360 described above. It can then send an invoice without knowing the service performed by the entity D for this entity U.

Figure 5B:
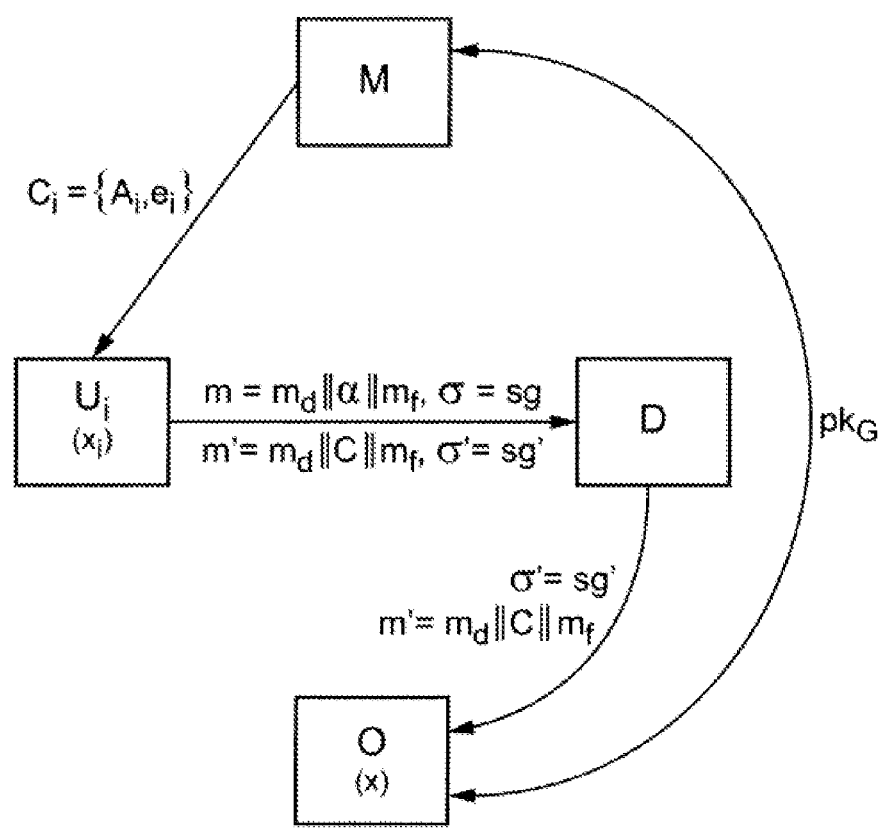
FIG. 5B illustrates the exchanges in the cryptographic system during the execution of the method according to a third embodiment of the invention.

FIG. 5B illustrates the data exchanges occurring between the entities of the cryptographic system when using the method of the third embodiment of the invention.

In this FIG. 5B, one can clearly see that the first and second signatures σ and σ', as well as the first and second messages m and m', are generated by the entity $U_i$ and sent to the checking entity D, which then only resends the second signature σ' and the second message m' to the identifying entity O.

Of course, the invention is not limited to the exemplary embodiments described and represented above, from which one can envision other embodiments and methods without exceeding the scope of the invention.

In particular, the role of the management entity M can be played by the identifying entity O, or even by the checking entity D. In the latter case, one should ensure that the anonymity revocation and group management functions are managed separately, particularly regarding the group signature sg chosen.

In addition, the role played by the verification entity O can also be played by multiple verification entities $O_j$, particularly for lifting the anonymity of a signature σ, such that it is necessary for all these entities $O_j$ to be present and active in order to lift the anonymity of a signature. When necessary, this prevents fraudulent entities O and D from being able to lift the anonymity of a signature σ.

The invention claimed is:

1. A cryptographic method for anonymous authentication and identification of a user entity by a checking entity and an identifying entity respectively, wherein:
the checking entity receives from the user entity at least one first signature and a first message and verifies the first signature by means of the first message in order to authenticate the user entity; and
the identifying entity receives from the checking entity a second signature linked to the first signature and identifies the user entity by means of the second signature and a secret key specific to the identifying entity;
wherein said method is executed by a processor device.

2. The cryptographic method according to claim 1, wherein the checking entity generates the second signature from the first signature as a function of at least a first part of the first message received.

3. A cryptographic method for anonymous authentication and identification of a user entity by a checking entity and an identifying entity respectively, wherein:
the checking entity receives from the user entity at least one first signature and a first message and verifies the first signature by means of the first message in order to authenticate the user entity; and
the identifying entity receives from the checking entity a second signature linked to the first signature and identifies the user entity by means of the second signature and a secret key specific to the identifying entity;
wherein the checking entity generates the second signature from the first signature as a function of at least a first part of the first message received and wherein the checking entity generates a second message from the first message by replacing the first part of the first message with substitution data, and sends the second message to the identifying unit; and
wherein said method is executed by a processor device.

4. The cryptographic method according to claim 3, wherein the checking entity is able to provide a service to the user entity if the checking entity authenticates the user entity wherein the identifying entity is able to invoice the user entity for this service, and wherein the first part indicates a service requested by the user entity and the second message comprises at least one part indicating the invoicing level related to the requested service.

5. The cryptographic method according to claim 4, wherein the substitution data comprises the part indicating the invoicing level related to the requested service.

6. The cryptographic method according to claim 4, wherein the first message comprises a second part indicating the invoicing level related to the requested service, and wherein the substitution data of the first message is sent by the user entity to the checking entity.

7. The cryptographic method according to claim 6, wherein it comprises, in the identifying entity, the verification of the second signature by means of the second message.

8. The cryptographic method according to claim 1, wherein the first message comprises a first part, wherein, in the user entity, the first signature is generated as a function of the first message and the second signature is generated as a function of a second message, said second message corresponding to the first message in which the first part has been replaced by substitution data.

9. The cryptographic method according to claim 8, wherein the second signature comprises at least one supplemental part comprised in the first signature (a), wherein said method comprises a verification step in the verification entity, to verify that the first and second signatures comprise said supplemental part.

10. The cryptographic method according to claim 8, wherein the checking entity is able to provide a service to the user entity if the checking entity authenticates the user entity, wherein the identifying entity is able to invoice the user entity for this service, and wherein said first part indicates a service requested by the user entity and said substitution data indicates an invoicing level related to the requested service.

11. A cryptographic method for anonymous authentication and identification of a user entity by a checking entity and an identifying entity respectively, wherein:
the checking entity receives from the user entity at least one first signature and a first message and verifies the first signature by means of the first message in order to authenticate the user entity; and the identifying entity receives from the checking entity a second signature linked to the first signature and identifies the user entity by means of the second signature and a secret key specific to the identifying entity;

further comprising preliminarily registering the user entity with a management entity in which the user entity obtains at least one element from the management entity, said element being used to generate the first signature;

wherein said method is executed by a processor device.

12. The cryptographic method according to claim 11, wherein said element is a certificate generated by the management entity as a function of a random number generated by the user entity.

13. The cryptographic method according to claim 12, wherein the management entity provides the certificate to the identifying entity and wherein the identification of the user entity is done using at least a part of the certificate, a secret key specific to the identifying entity, and at least a part of the second signature.

14. A cryptographic system for the separate authentication and identification of a user entity, comprising at least one user entity and a checking entity and an identifying entity, said system being able to implement a cryptographic method according to claim 1.

15. A cryptographic system for the separate authentication and identification of a user entity, said cryptographic system comprising at least one user entity, a checking entity, an identifying entity, and a management entity, wherein said cryptographic system is able to implement a cryptographic method according to claim 11.

* * * * *